(12) United States Patent
Dai et al.

(10) Patent No.: US 9,374,809 B2
(45) Date of Patent: Jun. 21, 2016

(54) TRANSMISSION METHOD AND USER EQUIPMENT FOR PHYSICAL UPLINK CONTROL CHANNEL

(75) Inventors: Bo Dai, Guangdong Province (CN); Bin Yu, Guangdong Province (CN); Peng Hao, Guangdong Province (CN); Chunli Liang, Guangdong Province (CN); Shuqiang Xia, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 62 days.

(21) Appl. No.: 14/374,578

(22) PCT Filed: Dec. 21, 2011

(86) PCT No.: PCT/CN2011/084345
§ 371 (c)(1),
(2), (4) Date: Nov. 5, 2014

(87) PCT Pub. No.: WO2012/155513
PCT Pub. Date: Nov. 22, 2012

(65) Prior Publication Data
US 2015/0305016 A1    Oct. 22, 2015

(30) Foreign Application Priority Data

Sep. 30, 2011  (CN) .......................... 2011 1 0293484

(51) Int. Cl.
*H04W 72/04*    (2009.01)
*H04L 5/00*    (2006.01)
(Continued)

(52) U.S. Cl.
CPC ............. *H04W 72/0413* (2013.01); *H04J 3/00* (2013.01); *H04L 1/1861* (2013.01); *H04L 5/001* (2013.01);
(Continued)

(58) Field of Classification Search
CPC ......... H04J 3/00; H04L 1/1861; H04L 5/001; H04L 5/0053; H04L 5/0098; H04L 5/1469; H04W 72/02; H04W 72/0413

USPC .......................................................... 370/280
See application file for complete search history.

(56) References Cited

U.S. PATENT DOCUMENTS

| 8,917,593 B2 * | 12/2014 | Damnjanovic .... H04W 56/0045 370/228 |
| 2010/0150206 A1 * | 6/2010 | Futagi ................... H04L 5/0057 375/130 |

(Continued)

FOREIGN PATENT DOCUMENTS

| CN | 101702823 A | 5/2010 |
| CN | 101778416 A | 7/2010 |

(Continued)

OTHER PUBLICATIONS

Technical Specification Group Radio Access Network; Evolved Universal Terrestrial Radio Access(E-UTRA); Physical layer procedures. 3GPP TS 36.213 V10.2.0 (Jun. 2011).

(Continued)

*Primary Examiner* — Stephen J Clawson
(74) *Attorney, Agent, or Firm* — Ling Wu; Stephen Yang; Ling and Yang Intellectual Property

(57) ABSTRACT

The present invention provides a method and user equipment for transmitting a physical uplink control channel. The method includes: in a carrier aggregation scenario, based on a predetermined rule, the transmission of the Physical Uplink Control Channel (PUCCH) is switched between a secondary component carrier and a primary component carrier, or the transmission of the PUCCH is only in the primary component carrier, which is selected by the user equipment (UE); and the UE transmitting the PUCCH in the selected component carrier. The present invention reduces the feedback time delay of uplink control information, and improves the utilization of uplink resources.

12 Claims, 3 Drawing Sheets

(51) Int. Cl.
  *H04L 1/18* (2006.01)
  *H04J 3/00* (2006.01)
  *H04W 72/02* (2009.01)
  *H04L 5/14* (2006.01)

(52) U.S. Cl.
  CPC ............ *H04L 5/0053* (2013.01); *H04L 5/0098* (2013.01); *H04L 5/1469* (2013.01); *H04W 72/02* (2013.01)

(56) References Cited

U.S. PATENT DOCUMENTS

| | | | | |
|---|---|---|---|---|
| 2011/0242982 | A1* | 10/2011 | Lunttila | H04L 5/001 370/241 |
| 2012/0063302 | A1* | 3/2012 | Damnjanovic | H04W 56/0045 370/228 |
| 2012/0127950 | A1* | 5/2012 | Chung | H04L 5/0055 370/329 |
| 2012/0140716 | A1* | 6/2012 | Baldemair | H04J 11/005 370/329 |
| 2012/0218904 | A1* | 8/2012 | Narasimha | H04L 5/001 370/248 |
| 2012/0243497 | A1* | 9/2012 | Chung | H04L 5/0055 370/329 |
| 2012/0275398 | A1* | 11/2012 | Chen | H04W 24/10 370/329 |

FOREIGN PATENT DOCUMENTS

| | | |
|---|---|---|
| CN | 101932005 A | 12/2010 |
| CN | 102075949 A | 5/2011 |
| WO | 2011021814 A2 | 2/2011 |

OTHER PUBLICATIONS

HARQ Feedback Mechanism in CA with Different TDD Configurations, 3GPP TSG-RAN WG1 Meeting #66 , Athens, Greece, Aug. 22-26, 2011, R1-112349, Media Tek Inc.

Consideration on Different TDD UL/DL Configurations for Interband CA, 3GPP TSG RAN WG1 Meeting #66, Athens, Greece, Aug. 22-26, 2011, R1-112474, LG Electronics.

Control and timing issues related to mixed TDD configurations In Inter-band CA, 3GPP TSG-RAN WG1 Meeting #75, Athens, Greece, Aug. 22-26, 2011, R2-114254, Inter Corporation.

Support of different TDD UL-DL configurations on different bands, 3GPP TSG-RAN WG1 Meeting #66 , Athens, Greece, Aug. 22-26, 2011, R1-112579, Potevio.

A special SCell for CA enhancement, 3GPP TSG-RAN WG2#74, Barcelona, Spain, May 9-13, 2011, R2-113048, Sharp.

International Search Report for PCT/CN2011/084345 dated Jun. 15, 2012.

* cited by examiner

TRANSMISSION METHOD AND USER EQUIPMENT FOR PHYSICAL UPLINK CONTROL CHANNEL

TECHNICAL FIELD

The patent document relates to the communication field, and in particular, to a method for transmitting a physical uplink control channel.

BACKGROUND OF THE RELATED ART

There are two kinds of frame structures in the Long Term Evolution (LTE) system. The frame structure type 1 is suitable for the Frequency Division Duplex (FDD) of the full duplex and the half duplex. As shown in FIG. 1, the length of each radio frame is 10 ms, made up of 20 slots, and each slot is 0.5 ms, which is numbered from 0 to 19. A subframe is made up of two continuous slots; for example, the subframe i is made up of two continuous slots $2i$ and $2i+1$. No matter it is the half duplex FDD or the full duplex FDD, the uplink and the downlink are transmitted at different frequencies; while for the half duplex FDD, the UE cannot send and receive data at the same time; while there is no such restriction for the full duplex FDD, that is, there can be 10 downlink and 10 uplink subframes in every 10 ms interval. The frame structure Type 2 is suitable for the Time Division Duplex (TDD). As shown in FIG. 2, the length of a radio frame is 10 ms, made up of two half-frame with the length of 5 ms. One half-frame is made up of 5 subframes of which the length is 1 ms. The supported uplink and downlink configuration is shown in Table 1; "D" in the table shows that the subframe is a downlink subframe, "U" shows that the subframe is an uplink subframe, and "S" shows that the subframe is a special subframe. The special subframe is made up of a downlink pilot time slot (DwPTS), a guard period (GP) and an uplink pilot time slot (UpPTS), and the total length is 1 ms. Each subframe i is made up of two slots $2i$ and $2i+1$ of which the lengths are 0.5 ms (15360*Ts).

The frame structure Type 2 supports two kinds of downlink-uplink switching cycles, 5 ms and 10 ms. In the uplink-downlink switching cycle of 5 ms, both of two half-frames have the special subframes. In the uplink-downlink switching cycle of 10 ms, only the first half-frame has the special subframe. The subframes 0, 5 and DwPTS are always reserved for the downlink transmission. The UpPTS and the next subframe which is adjacent to the special subframe are always reserved for the uplink transmission. Therefore, for the uplink-downlink switching cycle of 5 ms, the UpPTS, the subframe 2 and the subframe 7 are reserved for the uplink transmission; and for the uplink-downlink switching cycle of 10 ms, the UpPTS and the subframe 2 are reserved for the uplink transmission.

TABLE 1

| Uplink and downlink configuration | | | | | | | | | | | |
|---|---|---|---|---|---|---|---|---|---|---|---|
| Uplink and downlink configuration | switching cycle from downlink to uplink | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The LTE defines the following three kinds of downlink physical control channels: Physical Control Format Indicator Channel (PCFICH); Physical Hybrid Automatic Retransmission Request Indicator Channel (PHICH); Physical Downlink Control Channel (PDCCH).

Wherein, the information borne by the PCFICH is used to indicate the number of the Orthogonal Frequency Division Multiplexing (OFDM) symbol of the PDCCH transmitted in a subframe, and it is sent in the first OFDM symbol of the subframe, and the frequency location where it is located is determined by the system downlink bandwidth and the cell identity (ID). The PHICH is used to bear the acknowledgement/negative acknowledgement feedback information of the uplink transmission data. The number of the PHICH and the time and frequency location is determined by the system message and the cell ID in the Physical Broadcast Channel (PBCH) of the downlink carrier where the PHICH is located. The PDCCH is used to bear the Downlink Control Information (DCI), including: scheduling information of the Physical Uplink Shared Channel (PUSCH), scheduling information of the Physical Downlink Shared Channel (PDSCH), and the uplink power control information.

Since the LTE-Advanced network needs to be able to access the LTE users, its operation frequency band needs to cover the current LTE frequency band; there is no assignable spectral bandwidth of continuous 100 MHz in that frequency band, so one technology that the LTE-Advanced needs to solve is to aggregate several continuous component carriers (CC, frequency spectrum) distributed in different frequency bands together by adopting the Carrier Aggregation (CA) technology, to form the 100 MHz bandwidth which can be used by the LTE-Advanced. One component carrier can be regarded as a Cell too. In a plurality of component carriers aggregated by the terminal, the high layer will configure one pair of uplink/downlink component carrier therein as the primary uplink/downlink component carrier (PCell or PCC). Other component carriers are called the secondary component carriers (SCell or SCC). The LTE R10 standard defines that the physical uplink control channel can only be sent in the primary uplink component carrier.

CONTENT OF THE INVENTION

For the TDD system, when the uplink and downlink configurations adopted by the aggregated component carrier are not completely same, there exists a mix subframe, and there exist the uplink component carrier and the downlink component carrier in the mix subframe at the same time; as shown in Table 1, the subframe 3, the subframe 4, the subframe 7, the subframe 8 and the subframe 9 may be the mix subframes. In order to improve the spectral efficiency, the TDD terminal may support receiving and sending at the same time; at this moment, in order to reduce the feedback time delay of the uplink control information and improve the utilization of the uplink resources, the transmission of physical uplink control channel is switched between the secondary component carrier and the primary component carrier. Therefore, the technical problem that the patent document requires to solve is to provide a method for transmitting a physical uplink control channel, which can flexibly select the component carrier for transmitting the physical uplink control channel, and realize that the transmission of the physical uplink control channel is switched in the secondary component carrier and the primary component carrier.

In order to solve the above-mentioned technical problem, the patent document provides a method for transmitting a physical uplink control channel, comprising:

in a carrier aggregation scenario, based on a predetermined rule, transmission of a Physical Uplink Control Channel (PUCCH) being switched between a primary component carrier and a secondary component carrier, or the transmission of the PUCCH being only in the primary component carrier, which is selected by a User Equipment (UE); and the UE transmitting the PUCCH in a selected component carrier.

Preferably, the predetermined rule comprises:

according to an indication signaling transmitted by a network side, determining whether the transmission of the PUCCH is switched between the primary component carrier and the secondary component carrier, or the transmission of the PUCCH is only in the primary component carrier; or for a time division duplex (TDD) system, when uplink and downlink configurations adopted by an aggregated component carrier are not completely same, the transmission of the PUCCH is switched between the secondary component carrier and the primary component carrier; and when the uplink and downlink configurations adopted by the aggregated component carrier are completely same, only transmitting the PUCCH in the primary component carrier.

Optionally, the step of transmission of the PUCCH being switched between the secondary component carrier and the primary component carrier comprises: when there is the PUCCH that needs to be transmitted in a subframe N, when there is no primary uplink component carrier while only a secondary uplink component carrier in the subframe N, the UE transmitting the PUCCH in the secondary uplink component carrier of the subframe N; and when there is a primary uplink component carrier in the subframe N, the UE transmitting the PUCCH in the primary uplink component carrier of the subframe N, wherein, N is a subframe number; or, when there is the primary uplink component carrier and the secondary uplink component carrier in the subframe N, and when both the primary uplink component carrier and the secondary uplink component carrier have a corresponding PUCCH which needs to be transmitted, the UE selecting to transmit the corresponding PUCCH in the primary uplink component carrier and the secondary uplink component carrier of the subframe N at the same time.

Optionally, when the uplink and downlink configurations adopted by the aggregated component carrier are not completely same, if the transmission of the PUCCH is switched between the secondary component carrier and the primary component carrier selected by the UE, then every uplink and downlink configuration is corresponding to one component carrier which can transmit the PUCCH.

Optionally, one component carrier which can transmit the PUCCH corresponding to one uplink and downlink configuration is determined according to the following way:

if there is the primary component carrier in the component carrier adopting the same uplink and downlink configurations, then the primary component carrier is the component carrier therein which can transmit the PUCCH;

if there is no primary component carrier in the component carrier adopting the same uplink and downlink configurations, then selecting one secondary component carrier which can transmit the PUCCH therefrom by adopting any one of the following ways:

making a determination according to the secondary component carrier, which can be used for transmitting the PUCCH, configured in a high layer signaling by the network side; or, determining a secondary component carrier which transmits the PRACH as the secondary component carrier which can transmit the PUCCH; or, determining a first activated secondary component carrier in the component carrier adopting the same uplink and downlink configurations as the secondary component carrier which can transmit the PUCCH; or, determining a secondary component carrier with a lowest index in the component carrier adopting the same uplink and downlink configurations as the secondary component carrier which can transmit the PUCCH.

Optionally, PUCCH resources of an acknowledgement/negative acknowledgement (ACK/NACK) corresponding to the component carrier transmitting the PUCCH are obtained according to mapping of a control channel element (CCE), or obtained according to a high layer configuration and an acknowledgement/negative acknowledgement resource indicator (ARI) signaling, and ACK/NACK resources corresponding to other component carriers are obtained according to the high layer configuration and the ARI signaling.

Optionally, when there are channel state information (CSI) reports of m downlink component carriers which need to be transmitted at the same time and only the CSI reports of n downlink component carriers can be transmitted, according to a predetermined priority, the CSI reports of n downlink component carriers with the highest priority are transmitted, wherein, m is a positive integer greater than 1, and n is a positive integer greater than or equal to 1 and less than or equal to m.

Optionally, the priority is determined according to the following ways:

determining the priority according to a type of the CSI report firstly, for the CSI reports of the same type, then determining the priority according to the component carrier corresponding to the CSI report, wherein, the priority of the component carrier is that:

the priority of the primary component carrier is higher than the priority of the secondary component carrier that can transmit the PUCCH, and the priority of the secondary component carrier that can transmit the PUCCH is higher than the priority of the secondary component carrier that cannot transmit the PUCCH; for the secondary component carriers that can transmit the PUCCH and the secondary component carriers that cannot transmit the PUCCH, final priorities are determined then according to index values of the component carriers respectively, and the lower an index value of the component carrier is, the higher the priority is.

Optionally, when the uplink and downlink configurations adopted by the aggregated component carrier are not completely same, a scheduling request (SR) is only transmitted in the primary component carrier, or, transmitted in the primary component carrier and the secondary component carrier that can transmit the PUCCH.

Preferably, when the uplink and downlink configurations adopted by the aggregated component carrier are not completely same, the CSI report of the downlink component carrier is transmitted in the component carrier that can transmit the PUCCH corresponding to the uplink and downlink configuration adopted by the downlink component carrier; or transmitted only in the primary component carrier; or the transmission is switched between the secondary component carrier and the primary component carrier.

The patent document further provides a User Equipment, comprising:

a selection unit, configured to: in a carrier aggregation scenario, based on a predetermined rule, select to switch transmission of a Physical Uplink Control Channel (PUCCH) between a primary component carrier and a secondary component carrier, or only to transmit the PUCCH in the primary component carrier; and a transmission unit, configured to: transmit the PUCCH in a component carrier selected by the selection unit.

Optionally, the predetermined rule comprises:

according to an indication signaling transmitted by a network side, determining whether the transmission of the PUCCH is switched between the primary component carrier and the secondary component carrier, or the transmission of the PUCCH is only in the primary component carrier; or for a time division duplex (TDD) system, when uplink and downlink configurations adopted by an aggregated component carrier are not completely same, the transmission of the PUCCH being switched between the secondary component carrier and the primary component carrier; and when the uplink and downlink configurations adopted by the aggregated component carrier are completely same, the transmission of the PUCCH being only in the primary component carrier.

Optionally, the transmission of the PUCCH being switched between the secondary component carrier and the primary component carrier comprises: when there is the PUCCH that needs to be transmitted in a subframe N, when there is no primary uplink component carrier while only a secondary uplink component carrier in the subframe N, the UE transmitting the PUCCH in the secondary uplink component carrier of the subframe N; and when there is a primary uplink component carrier in the subframe N, the UE transmitting the PUCCH in the primary uplink component carrier of the subframe N, wherein, N is a subframe number; or, when there is the primary uplink component carrier and the secondary uplink component carrier in the subframe N and both the primary uplink component carrier and the secondary uplink component carrier have a corresponding PUCCH which needs to be transmitted, the UE selecting to transmit the corresponding PUCCH in the primary uplink component carrier and the secondary uplink component carrier of the subframe N at the same time.

Optionally, when the uplink and downlink configurations adopted by the aggregated component carrier are not completely same, if the transmission of the PUCCH is switched between the secondary component carrier and the primary component carrier, then every uplink and downlink configuration is corresponding to one component carrier which can transmit the PUCCH.

The above-mentioned scheme flexibly selects the component carrier for transmitting the physical uplink control channel, and the transmission of the physical uplink control channel is switched between the secondary component carrier and the primary component carrier, thereby reducing the feedback time delay of the uplink control information, and improving the utilization of uplink resources.

PREFERRED EMBODIMENTS OF THE PRESENT INVENTION

The embodiment of the present invention is described in detail with reference to the accompanying drawings and embodiments hereinafter. It should be illustrated that, in the case of no conflicts, the embodiments in the present application and features in these embodiments can be combined with each other.

In the embodiment of the present invention, based on a predetermined rule, a User Equipment (UE) selects to switch the transmission of a Physical Uplink Control Channel (PUCCH) between a primary component carrier and a secondary component carrier, or only to transmit the PUCCH in the primary component carrier; and then the UE transmits the PUCCH in a selected component carrier.

Embodiment 1

Figure 1:
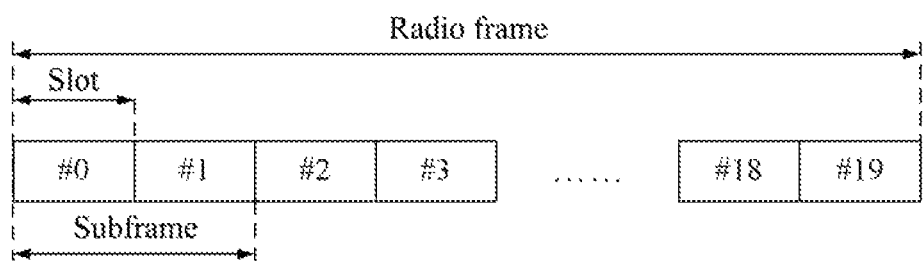
FIG. 1 is a diagram of a frame structure in an FDD mode in the related art.
Figure 2:
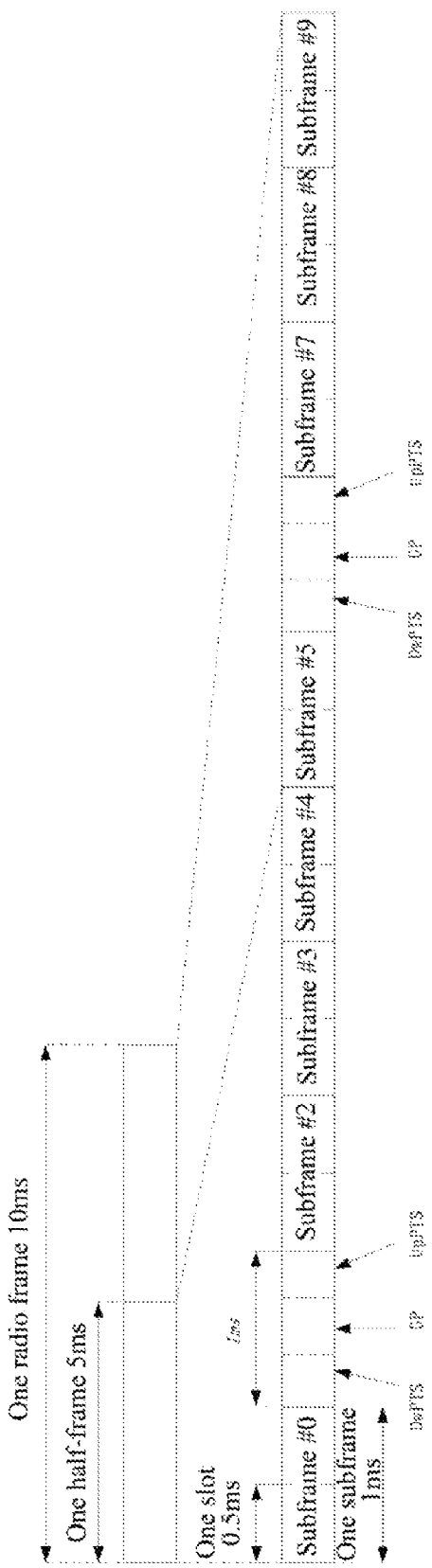
FIG. 2 is a diagram of a frame structure in a TDD mode in the related art.
Figure 3:
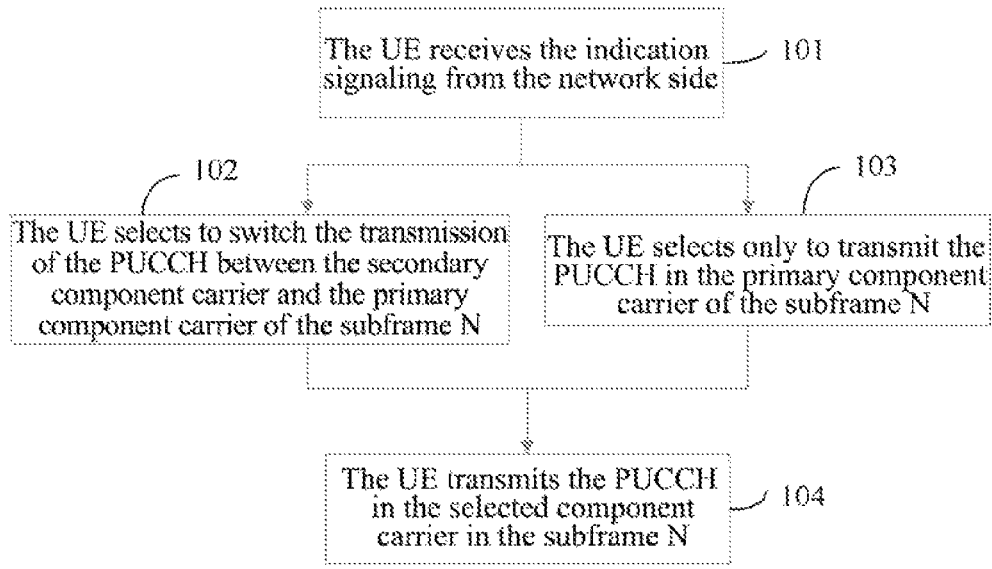
FIG. 3 is a flow chart of embodiment 1 of the present invention.

The above-mentioned predetermined rule can be that: in a carrier aggregation scenario, according to an indication signaling received from the network side, the UE determines whether to switch the transmission between the secondary component carrier and the primary component carrier, or only to perform transmission in the primary component carrier. As shown in FIG. 3, the method of the present embodiment includes the following steps:

in step 101: the UE receives the indication signaling from the network side; if the indication signaling indicates to switch the transmission of the PUCCH between the secondary component carrier and the primary component carrier, step 102 is executed; if the indication signaling indicates to transmit the PUCCH only in the primary component carrier, step 103 is executed.

In step 102: the UE selects to switch the transmission of the PUCCH between the secondary component carrier and the primary component carrier of the subframe N, and N is a sub frame number.

Said switching the transmission of the PUCCH between the secondary component carrier and the primary component carrier refers to: when there is the PUCCH that needs to be transmitted in a subframe N, if there is no primary uplink component carrier while only the secondary uplink component carrier in the subframe N, then the PUCCH is transmitted in the secondary uplink component carrier of the subframe N; and if there is the primary uplink component carrier in the subframe N, then the PUCCH is transmitted in the primary uplink component carrier of the subframe N.

In step 103, the UE selects only to transmit the PUCCH in the primary uplink component carrier of the subframe N.

In step 104, the UE transmits the PUCCH in selected component carrier in the subframe N.

For example, there are 2 aggregated component carriers (CC1 and CC2), and the CC1 adopts the uplink and downlink configuration 2 and the CC2 adopts the uplink and downlink configuration 1, wherein, the CC1 is the primary component carrier and the CC2 is the secondary component carrier; as shown in Table 1, both the CC1 and the CC2 are the uplink component carriers in the subframes 2 and 7, and the CC2 is the uplink component carrier and the CC1 is the downlink component carrier in the subframes 3 and 8:

when the indication signaling indicates only to transmit the PUCCH in the primary component carrier, the PUCCH can only be transmitted in the uplink subframes 2 and 7 of the CC1;

when the indication signaling indicates to switch the transmission between the secondary component carrier and the primary component carrier, the PUCCH is transmitted in the CC1 in the subframe 2 and the subframe 7, and the PUCCH is transmitted in the CC2 in the subframe 3 and the subframe 8.

Embodiment 2

Figure 4:
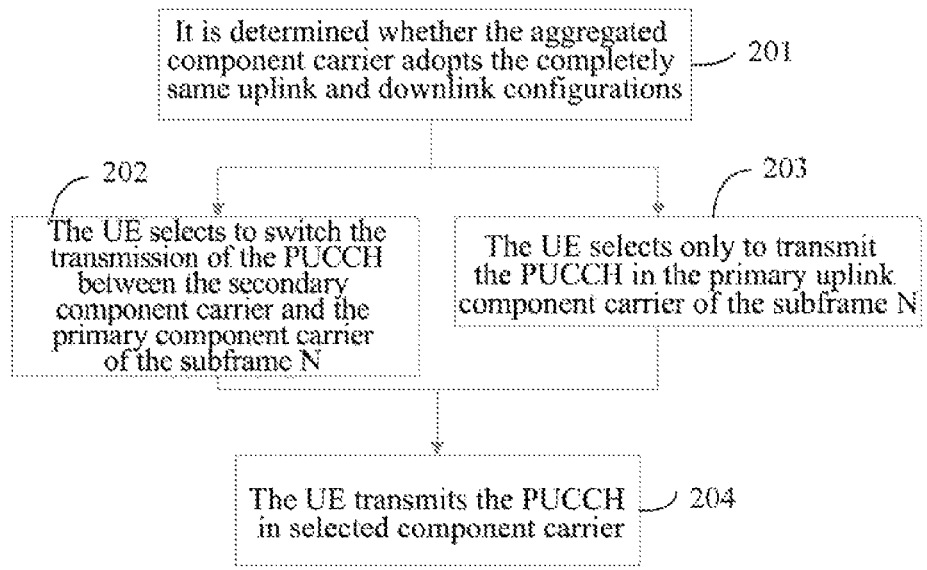
FIG. 4 is a flow chart of embodiment 2 of the present invention.

In the present embodiment, the predetermined rule is: for a time division duplex (TDD) system, when uplink and downlink configurations adopted by an aggregated component carrier are not completely same, the transmission of the PUCCH being switched between the secondary component carrier and the primary component carrier; and when the uplink and downlink configurations adopted by the aggregated component carrier are completely same, only transmitting the PUCCH in the primary component carrier. As shown in FIG. 4, the method of the present embodiment includes the following steps:

in step 201, in the TDD system, it is determined whether the aggregated component carrier adopts the completely same uplink and downlink configurations; if not completely same, then step 202 is executed; if completely same, step 203 is executed.

In step 202, the UE selects to switch the transmission of the PUCCH between the secondary component carrier and the primary component carrier.

In step 203, the UE selects only to transmit the PUCCH in the primary uplink component carrier.

In step 204, the UE transmits the PUCCH in selected component carrier.

Wherein, said performing the transmission between the secondary component carrier and the primary component carrier refers to: when there is the PUCCH that needs to be transmitted in a subframe N, if there is no primary uplink component carrier while only the secondary uplink component carrier in the subframe N, then the PUCCH is transmitted in the secondary uplink component carrier of the subframe N; and if there is the primary uplink component carrier in the subframe N, then the PUCCH is transmitted in the primary uplink component carrier of the subframe N, and N is the subframe number.

For example, there are 2 aggregated component carriers (CC1 and CC2), and the CC1 adopts the uplink and downlink configuration 4 and the CC2 adopts the uplink and downlink configuration 3, wherein, the CC1 is the primary component carrier and the CC2 is the secondary component carrier; as shown in Table 1, both the CC1 and the CC2 are the uplink component carriers in the subframes 2 and 3, and the CC2 is the uplink component carrier and the CC1 is the downlink component carrier in the subframe 4, then the PUCCH is transmitted in the CC1 in the subframe 2 and the subframe 3, and the PUCCH is transmitted in the CC2 in the subframe 4.

If there are 2 aggregated component carriers (CC1 and CC2), and the CC1 and the CC2 adopt the same uplink and downlink configuration 1, wherein, the CC1 is the primary component carrier, then the PUCCH is only transmitted in the CC1.

Embodiment 3

The method of the present embodiment is much the same with embodiment 1, and the difference lies in that:

when the transmission of the PUCCH is switched between the secondary component carrier and the primary component carrier, when there is the primary uplink component carrier and the secondary uplink component carrier and both the primary uplink component carrier and the secondary uplink component carrier have corresponding PUCCHs to be transmitted, the corresponding PUCCHs are transmitted in the primary uplink component carrier and the secondary uplink component carrier at the same time.

For example, there are 2 aggregated component carriers (CC1 and CC2), and the CC1 adopts the uplink and downlink configuration 2 and the CC2 adopts the uplink and downlink configuration 1, wherein, the CC1 is the primary component carrier and the CC2 is the secondary component carrier; as shown in Table 1, both the CC1 and the CC2 are the uplink component carriers in the subframes 2 and 7, and the CC2 is the uplink component carrier and the CC1 is the downlink component carrier in the subframes 3 and 8, then:

when the indication signaling indicates only to transmit the PUCCH in the primary component carrier, the PUCCH can only be transmitted in the uplink subframe of the CC1;

when the indication signaling indicates to perform transmission between the secondary component carrier and the primary component carrier, if in the subframes 2 and 7, both the CC1 and the CC2 have the corresponding PUCCHs which can be transmitted, then the PUCCHs can be transmitted in the CC1 and the CC2 at the same time; or else, it can select any one of the CC1 and the CC2 in the subframe 2 to transmit the PUCCH; or it selects any one of the CC1 and the CC2 in the subframe 7 to transmit the PUCCH; and the PUCCH is transmitted in the CC2 in the subframes 3 and 8.

Embodiment 4

The method of the present embodiment is much the same with embodiment 2, and the difference lies in that:

when the transmission of the PUCCH is switched between the secondary component carrier and the primary component carrier, when there is the primary uplink component carrier and the secondary uplink component carrier and both the primary uplink component carrier and the secondary uplink component carrier have corresponding PUCCHs required to be transmitted, the corresponding PUCCHs are transmitted in the primary uplink component carrier and the secondary uplink component carrier at the same time.

For example, there are 5 aggregated component carriers (CC1-CC5), and the CC1 adopts the uplink and downlink configuration 1, the CC2 and CC3 adopt the uplink and downlink configuration 2, and the CC4 and CC5 adopt the uplink and downlink configuration 3, wherein, the CC1 is the primary component carrier, and other component carriers are the secondary component carriers, then:

in the subframe 2, when there are the corresponding PUCCHs which need to be transmitted in the CC1, the CC2 and the CC4, the PUCCHs can be transmitted in the CC1, the CC2 and the CC4 at the same time; or else, the PUCCHs can be transmitted in the any one of the three or any two of the three;

in the subframe 3, when there are the corresponding PUCCHs which need to be transmitted in the CC1 and the CC4, the PUCCHs can be transmitted in the CC1 and the CC4 at the same time; or else, the PUCCHs can be transmitted in the any one of the two;

in the subframe 4, the PUCCH is transmitted in the CC4;

in the subframe 7, when there are the corresponding PUCCHs which need to be transmitted in the CC1 and the CC2, the PUCCHs can be transmitted in the CC1 and the CC4 at the same time; or else, the PUCCHs can be transmitted in the any one of the two; in the subframe 8, the PUCCH is transmitted in the CC1.

If there are 5 aggregated component carriers (CC1-CC5), and every component carrier adopts the uplink and downlink configuration 1, wherein, the CC1 is the primary component carrier, and other component carriers are the secondary component carriers, then the PUCCH is only transmitted in the uplink subframe of the CC1.

Embodiment 5

According to the method of embodiment 2 and 4, when the uplink and downlink configurations adopted by the aggregated component carrier are not completely same, the UE can switch the transmission of the PUCCH between the secondary component carrier and the primary component carrier. The present embodiment provides a method for selecting the component carrier which can transmit the PUCCH, wherein, every uplink and downlink configuration is corresponding to one component carrier which can transmit the PUCCH, that is, selecting one from the component carriers adopting the same uplink and downlink configuration as the component carrier which can transmit the PUCCH.

In the example 1, there are 5 aggregated component carriers (CC1-CC5), wherein, both the CC1 and the CC2 adopt the uplink and downlink configuration 1, and the CC3, the CC4 and the CC5 all adopt the uplink and downlink configuration 2; if the UE can switch the transmission of the PUCCH between the secondary component carrier and the primary component carrier, then there is one component carrier that can transmit the PUCCH in the component carrier 1 and the component carrier 2, and there is one component carrier that can transmit the PUCCH in the component carrier 3 and the component carrier 4, and the component carrier 5.

In the example 2, there are 2 aggregated component carriers (CC1 and CC2), wherein, the CC1 adopts the uplink and downlink configuration 1, and the CC2 adopts the uplink and downlink configuration 2; if the transmission of the PUCCH is switched by the UE between the secondary component carrier and the primary component carrier, then both the CC1 and the CC2 can transmit the PUCCH.

In the example 3, there are 5 aggregated component carriers (CC1-CC5), wherein, the CC1 adopts the uplink and downlink configuration 1, both the CC2 and the CC3 adopt the uplink and downlink configuration 2, and both the CC4 and the CC5 adopt the uplink and downlink configuration 3; if the transmission of the PUCCH is switched by UE between the secondary component carrier and the primary component carrier, then the CC1 can transmit the PUCCH, there is one component carrier that can transmit the PUCCH in the CC2 and the CC3, and there is one component carrier that can transmit the PUCCH in the component carrier 4 and the component carrier 5.

Embodiment 6

Based on the method of embodiment 5, when the uplink and downlink configurations adopted by the aggregated component carriers are not completely same, every uplink and downlink configuration is corresponding to one component carrier which can transmit the PUCCH, that is, there is one component carrier which can transmit the PUCCH in the component carriers adopting the same uplink and downlink configuration. The present embodiment can determine the component carrier which can transmit the PUCCH in the component carriers adopting the same uplink and downlink configuration by adopting the following way:

if there is the primary component carrier in the component carrier adopting the same uplink and downlink configurations, then the primary component carrier is the component carrier therein which can transmit the PUCCH;

if there is no primary component carrier in the component carrier adopting the same uplink and downlink configurations, then selecting one secondary component carrier which can transmit the PUCCH therefrom by adopting any one of the following ways.

In way one, the selection is performed according to the configuration made by the network side in the high layer signaling.

For example, there are 4 aggregated component carriers (CC1-CC4), wherein, both the CC1 and the CC2 adopt the uplink and downlink configuration 1, and both the CC3 and the CC4 adopt the uplink and downlink configuration 2; the CC1 is the primary component carrier, and other component carriers are the secondary component carriers; if the high layer signaling configures the component carrier 3 as the component carrier that can transmit the PUCCH, then the CC1 and the CC3 are corresponding to the component carriers, which can transmit the PUCCH, of the uplink and downlink configuration 1 and 2 respectively.

In way two, the secondary component carrier which transmits the PRACH is determined as the secondary component carrier which can transmit the PUCCH.

For example, there are 5 aggregated component carriers (CC1-CC5), wherein, both the CC1 and the CC2 adopt the uplink and downlink configuration 1, and the CC3, CC4 and the CC5 all adopt the uplink and downlink configuration 2; the CC1 is the primary component carrier, and other component carriers are the secondary component carriers; if the CC1 and the CC4 are the component carriers that transmit the PRACH, then the CC1 and the CC4 are corresponding to the component carriers, which can transmit the PUCCH, of the uplink and downlink configuration 1 and 2 respectively.

In way three, the first activated secondary component carrier in the component carrier corresponding to an uplink and downlink configuration is determined as the secondary component carrier which can transmit the PUCCH.

For example, there are 3 aggregated component carriers (CC1-CC3), wherein, the CC1 adopts the uplink and downlink configuration 1, and both the CC2 and the CC3 adopt the uplink and downlink configuration 2; the CC1 is the primary component carrier, and other component carriers are the secondary component carriers; if the activation consequence of various component carriers is CC1, CC2 and CC3, then the CC1 and the CC2 are corresponding to the component carriers, which can transmit the PUCCH, of the uplink and downlink configuration 1 and 2 respectively.

In way four, the secondary component carrier with a lowest index in the secondary component carrier corresponding to an uplink and downlink configuration is determined as the secondary component carrier which can transmit the PUCCH.

For example, there are 5 aggregated component carriers (CC1-CC5), wherein, the CC1 adopts the uplink and downlink configuration 1, both the CC2 and the CC3 adopt the uplink and downlink configuration 2, and both the CC4 and the CC5 adopt the uplink and downlink configuration 3; the CC1 is the primary component carrier, and other component carriers are the secondary component carriers; then the CC1, CC2 and the CC4 are corresponding to the component carriers, which can transmit the PUCCH, of the uplink and downlink configuration 1, 2 and 3 respectively.

Embodiment 7

After selecting the component carrier transmitting the PUCCH, the PUCCH resources of an acknowledgement/negative acknowledgement (ACK/NACK) corresponding to the component carrier transmitting the PUCCH are obtained according to mapping of a control channel element (CCE), or obtained according to a high layer configuration and an ACK/NACK resource indicator (ARI) signaling, and ACK/NACK resources corresponding to other component carriers are obtained according to the high layer configuration and the ARI signaling. Wherein, the PUCCH is the PUCCH Format 1a/1b.

For example, there are 2 aggregated component carriers (CC1-CC2), wherein, the CC1 adopts the uplink and downlink configuration 1, and the CC2 adopts the uplink and downlink configuration 2; the CC1 is the primary component carrier, and the CC2 is the secondary component carriers; the CC1 and the CC2 are the component carriers that can transmit the PUCCH. Then, the PUCCH resources in the uplink CC1 corresponding to the ACK/NACK corresponding to the physical downlink control channel (PDCCH) in the downlink CC1 are obtained according to the mapping of the CCE where the PDCCH is located; when there is no corresponding PDCCH, the PUCCH resources are obtained according to the high layer configuration and the ARI signaling; the PUCCH resources in the uplink CC2 corresponding to the ACK/NACK corresponding to the PDCCH of the downlink CC2 are also obtained according to the mapping of the CCE where the PDCCH is located; when there is no corresponding PDCCH, the PUCCH resources are obtained according to the high layer configuration and the ARI signaling.

For example, there are 3 aggregated component carriers (CC1-CC3), wherein, the CC1 adopts the uplink and downlink configuration 1, and both the CC2 and the CC3 adopt the uplink and downlink configuration 2; the CC1 is the primary component carrier, and other component carriers are the secondary component carriers; the CC1 and the CC2 are the component carriers that can transmit the PUCCH. Then, the PUCCH resources in the uplink CC1 corresponding to the ACK/NACK corresponding to the physical downlink control channel (PDCCH) in the downlink CC1 are obtained according to the mapping of the CCE where the PDCCH is located; when there is no corresponding PDCCH, the PUCCH resources are obtained according to the high layer configuration and the ARI signaling; the PUCCH resources in the uplink CC2 corresponding to the ACK/NACK corresponding to the PDCCH in the downlink CC2 are also obtained according to the mapping of the CCE where the PDCCH is located; when there is no corresponding PDCCH, the PUCCH resources are obtained according to the high layer configuration and the ARI signaling; and the PUCCH resources in the uplink CC3 corresponding to the ACK/NACK corresponding to the PDCCH in the downlink CC3 are obtained according to the high layer configuration and the ARI indication.

Wherein, the method for obtaining the PUCCH resources according to the mapping of CCE can refer to the description in the LTE R8 standard (TS 36.213 V910), and it will no longer goes into details here.

Said obtaining according to the high layer configuration and the ARI signaling refers to: the high layer configures n PUCCH resources for the target UE, and then instructs the user to select which PUCCH resource for transmission in n PUCCH resources through the ARI signaling.

Embodiment 8

During transmitting the PUCCH, when there are channel state information (CSI) reports of m downlink component carriers which are transmitted at the same time, and when only the CSI reports of n component carriers can be transmitted, then according to a predetermined priority, the CSI reports of n component carriers with the highest priority are transmitted, wherein, m is a positive integer greater than 1, and n is a positive integer greater than or equal to 1 and less than or equal to m.

the way for determining the priority is:

determining the priority according to the type of the CSI report firstly, for the CSI reports of the same type, then determining the priority according to the priority of component carrier, wherein, the priority of the component carrier is that: the priority of the primary component carrier is higher than the priority of the secondary component carrier that can transmit the PUCCH, and the priority of the secondary component carrier that can transmit the PUCCH is higher than the priority of the secondary component carrier that cannot transmit the PUCCH; when the priorities of the component carriers are same, final priorities are determined then according to the index of the component carriers, and the lower the index value is, the higher the priority is.

For example, there are 3 aggregated component carriers (CC1-CC3), wherein, the CC1 adopts the uplink and downlink configuration 1, and both the CC2 and the CC3 adopt the uplink and downlink configuration 2; the CC1 is the primary component carrier, and other component carriers are the secondary component carriers; the CC1 and the CC2 are the component carriers that can transmit the PUCCH. Then the priority of the downlink CC1 is higher than that of the downlink CC2, and the priority of the downlink CC2 is higher than that of the downlink CC3.

When there is the CSIs, which need to be fed back, of the downlink CC1, the downlink CC2 and the downlink CC3 in the subframe 3 at the same time and the types of fed-back CSI report are the same, if the CSI information of two component carriers can be transmitted at the same time, then the CSI information of the downlink CC1 and the downlink CC2 is transmitted; and if the CSI information of only one component carrier can be transmitted, then the CSI information of the downlink CC1 is transmitted.

Embodiment 9

When the uplink and downlink configurations adopted by the aggregated component carrier are not completely same, the method for transmitting the scheduling request (SR) is: only transmitting in the primary component carrier, or, transmitting in the primary component carrier and the secondary component carrier that can transmit the PUCCH. The selection of the component carrier can adopt any one method in embodiments 1-6 and it will not go into details here.

Embodiment 10

When the uplink and downlink configurations adopted by the aggregated component carrier are not completely same, the method for transmitting the CSI report of the downlink component carrier is as follows:

in way one, it is transmitted in the component carrier that can transmit the PUCCH corresponding to the uplink and downlink configuration adopted by the downlink component carrier.

For example, there are 3 aggregated component carriers (CC1-CC3), wherein, the CC1 adopts the uplink and downlink configuration 1, and both the CC2 and the CC3 adopt the uplink and downlink configuration 2; the CC1 is the primary component carrier, and other component carriers are the secondary component carriers; the CC1 and the CC2 are the component carriers that can transmit the PUCCH. Then the CSI of the downlink CC1 is transmitted in the uplink CC1, and the CSI information of the downlink CC2 and the downlink CC3 is transmitted in the uplink CC2.

In way two, it is transmitted only in the primary component carrier.

For example, there are 3 aggregated component carriers (CC1-CC3), wherein, the CC1 adopts the uplink and downlink configuration 1, and both the CC2 and the CC3 adopt the uplink and downlink configuration 2; the CC1 is the primary component carrier, and other component carriers are the secondary component carriers. Then all CSI information of the downlink CC1, the downlink CC2 and the downlink CC3 is transmitted in the uplink CC1.

In way three, the transmission is switched between the secondary component carrier and the primary component carrier.

For example, there are 3 aggregated component carriers (CC1-CC3), wherein, the CC1 adopts the uplink and downlink configuration 1, and both the CC2 and the CC3 adopt the uplink and downlink configuration 2; the CC1 is the primary component carrier, and other component carriers are the secondary component carriers; the CC1 and the CC2 are the component carriers that can transmit the PUCCH. Then, the CSI information of the downlink CC1, the downlink CC2 and the downlink CC3 can be transmitted in the uplink CC1, or in the uplink CC2, or in the uplink CC1 and the uplink CC2 at the same time.

The embodiment of the present invention further provides a User Equipment, comprising:

a selection unit, configured to: in a carrier aggregation scenario, based on a predetermined rule, select to switch transmission of a Physical Uplink Control Channel (PUCCH) between a primary component carrier and a secondary component carrier, or only to transmit the PUCCH in the primary component carrier; and a transmission unit, configured to: transmit the PUCCH in a component carrier selected by the selection unit.

The predetermined rule includes:

according to an indication signaling transmitted by a network side, determining whether the transmission of the PUCCH is switched between the primary component carrier and the secondary component carrier, or the transmission of the PUCCH is only in the primary component carrier; or for a time division duplex (TDD) system, when uplink and downlink configurations adopted by an aggregated component carrier are not completely same, the transmission of the PUCCH being switched between the secondary component carrier and the primary component carrier; and if the uplink and downlink configurations adopted by the aggregated component carrier are completely same, only transmitting the PUCCH in the primary component carrier.

Said the transmission of the PUCCH being switched between the secondary component carrier and the primary component carrier includes: when there is the PUCCH that needs to be transmitted in a subframe N, when there is no primary uplink component carrier while only a secondary uplink component carrier in the subframe N, the UE transmitting the PUCCH in the secondary uplink component carrier of the subframe N; and when there is a primary uplink component carrier in the subframe N, the UE transmitting the PUCCH in the primary uplink component carrier of the subframe N; or, when there is no primary uplink component carrier while only a secondary uplink component carrier in the subframe N, the UE transmitting the PUCCH in the secondary uplink component carrier of the subframe N; when there is the primary uplink component carrier and the secondary uplink component carrier in the subframe N and both the primary uplink component carrier and the secondary uplink component carrier have a corresponding PUCCH which needs to be transmitted, the UE selecting to transmit the corresponding PUCCH in the primary uplink component carrier and the secondary uplink component carrier of the subframe N at the same time.

When the uplink and downlink configurations adopted by the aggregated component carrier are not completely same, if the transmission of the PUCCH is switched between the secondary component carrier and the primary component carrier, then every uplink and downlink configuration is corresponding to one component carrier which can transmit the PUCCH.

It can be understood by those skilled in the art that all or part of steps in the above-mentioned embodiment can be fulfilled by the program instructing the related hardware, and the program can be stored in a computer readable storage medium, and when the program is executed, it includes one of the steps of the method embodiment or its combination.

In addition, each function unit in the each embodiment of the present invention can be implemented in the form of hardware, or in the form of the software function module. When the integrated module is implemented in the form of the software function module and is sold or used as an individual product, it can be stored in a computer readable storage medium.

The above-mentioned storage medium can be a read only memory, a magnetic disk or an optical disk, etc.

The above description is only the specific embodiment of the present invention and is not intended to limit the protection scope of the patent document. Those modifications and replacements which can be thought out easily by those skilled in the art in the technical scope disclosed by the patent document should be included in the protection scope of the patent document. Therefore, the protection scope of the patent document should be based on the protection scope described by the claims.

INDUSTRIAL APPLICABILITY

The method and device provided by the embodiment of the present invention can flexibly select the component carrier for transmitting the physical uplink control channel, which realizes that the transmission of the physical uplink control channel is switched between the secondary component carrier and the primary component carrier, thus reducing the feedback time delay of the uplink control information and improving the utilization of uplink resources.

What we claim is:

1. A method for transmitting a physical uplink control channel, comprising:

in a carrier aggregation scenario, based on a predetermined rule, a User Equipment (UE) selecting to switch transmission of a Physical Uplink Control Channel (PUCCH)

between a primary component carrier and a secondary component carrier, or only to transmit the PUCCH in the primary component carrier; and the UE transmitting the PUCCH in a selected component carrier;

wherein the step of switch transmission of the PUCCH between the secondary component carrier and the primary component carrier comprises: when there is the PUCCH that needs to be transmitted in a subframe N, when there is no primary uplink component carrier while only a secondary uplink component carrier in the subframe N, the UE transmitting the PUCCH in the secondary uplink component carrier of the subframe N; or when there is the primary uplink component carrier in the subframe N, the UE transmitting the PUCCH in the primary uplink component carrier of the subframe N, wherein, N is a subframe number; or, when there is the primary uplink component carrier and the secondary uplink component carrier in the subframe N and both the primary uplink component carrier and the secondary uplink component carrier have a corresponding PUCCH which needs to be transmitted, the UE selecting to transmit the corresponding PUCCH on the primary uplink component carrier and the secondary uplink component carrier of the subframe N at the same time.

2. The method according to claim 1, wherein, the predetermined rule comprises:

according to an indication signaling transmitted by a network side, determining whether the transmission of the PUCCH is switched between the primary component carrier and the secondary component carrier, or the transmission of the PUCCH is only in the primary component carrier; or for a time division duplex (TDD) system, when uplink and downlink configurations adopted by aggregated component carriers are not completely the same, the transmission of the PUCCH being switched between the secondary component carrier and the primary component carrier; and when uplink and downlink configurations adopted by the aggregated component carriers are completely the same, only transmitting the PUCCH in the primary component carrier.

3. The method according to claim 1, wherein, when uplink and downlink configurations adopted by aggregated component carriers are not completely the same, if the UE selects to switch the transmission of the PUCCH between the secondary component carrier and the primary component carrier, then one component carrier from the component carriers adopting the same uplink and downlink configuration is selected as the component carrier which can transmit the PUCCH.

4. The method according to claim 3, wherein one component carrier from the component carriers adopting the same uplink and downlink configuration is selected as the component carrier which can transmit the PUCCH according to a following way:

if there is the primary component carrier in component carriers adopting the same uplink and downlink configurations, then the primary component carrier is the component carrier therein which can transmit the PUCCH;

if there is no primary component carrier in the component carriers adopting the same uplink and downlink configurations, then selecting one secondary component carrier which can transmit the PUCCH therefrom by adopting any one of following ways:

making a determination according to the secondary component carrier, which can be used for transmitting the PUCCH, configured in a higher layer signaling by a network side; or, determining a secondary component carrier which transmits PRACH as the secondary component carrier which can transmit the PUCCH; or, determining a first activated secondary component carrier in the component carriers adopting the same uplink and downlink configurations as the secondary component carrier which can transmit the PUCCH; or, determining a secondary component carrier with a lowest index in the component carriers adopting the same uplink and downlink configurations as the secondary component carrier which can transmit the PUCCH.

5. The method according to claim 1, wherein,

PUCCH resources of an acknowledgment/negative acknowledgment (ACK/NACK) corresponding to a component carrier transmitting the PUCCH are obtained according to mapping of a control channel element (CCE); or PUCCH resources of an acknowledgment/negative acknowledgment (ACK/NACK) corresponding to a component carrier transmitting the PUCCH are obtained according to a higher layer configuration and an acknowledgement/negative acknowledgement resource indicator (ARI) signaling, and ACK/NACK resources corresponding to other component carriers are obtained according to the higher layer configuration and the ARI signaling.

6. The method according to claim 1, further comprises, when there are channel state information (CSI) reports of m downlink component carriers which need to be transmitted at the same time and only the CSI reports of n downlink component carriers can be transmitted, according to a predetermined priority, the CSI reports of n downlink component carriers with highest priority are transmitted, wherein, m is a positive integer greater than 2, and n is a positive integer greater than or equal to 1 and less than or equal to m.

7. The method according to claim 6, wherein, the priority is determined according to following ways:

determining the priority according to the type of the CSI reports firstly, for the CSI reports of the same type, then determining the priority according to a component carrier corresponding to CSI, wherein, the priority of the component carrier is that:

a priority of the primary component carrier is higher than a priority of the secondary component carrier that can transmit the PUCCH, and the priority of the secondary component carrier that can transmit the PUCCH is higher than a priority of the secondary component carrier that cannot transmit the PUCCH; for the secondary component carriers that can transmit the PUCCH and the secondary component carrier that cannot transmit the PUCCH, final priorities are then determined respectively according to index values of the component carriers, and the lower an index value of the component carrier is, the higher the priority is.

8. The method according to claim 1, wherein, when uplink and downlink configurations adopted by aggregated component carriers are not completely the same, a scheduling request (SR) is only transmitted in the primary component carrier, or, transmitted in the primary component carrier and the secondary component carrier that can transmit the PUCCH.

9. The method according to claim 1, wherein, when uplink and downlink configurations adopted by aggregated component carriers are not completely the same, a CSI report of a downlink component carrier is transmitted in a component carrier that can transmit the PUCCH corresponding to uplink and downlink configuration adopted by the downlink component carrier; or transmitted only in the primary component carrier; or transmission being switched between the secondary component carrier and the primary component carrier.

10. A User Equipment (UE), comprising a processor, and a storage device for storing computer executable instructions that when executed by the processor cause the processor to perform the steps in following units:
- a selection unit, configured to: in a carrier aggregation scenario, based on a predetermined rule, select to switch transmission of a Physical Uplink Control Channel (PUCCH) between a primary component carrier and a secondary component carrier, or only to transmit the PUCCH in the primary component carrier; and
- a transmission unit, configured to: transmit the PUCCH in a component carrier selected by the selection unit;
- wherein the selection unit is further configured to switch the transmission of the PUCCH between the secondary component carrier and the primary component carrier in a following way: when there is the PUCCH that needs to be transmitted in a subframe N,
- when there is no primary uplink component carrier while only a secondary uplink component carrier in the subframe N, the UE transmitting the PUCCH in the secondary uplink component carrier of the subframe N; or
- when there is the primary uplink component carrier in the subframe N, the UE transmitting the PUCCH in the primary uplink component carrier of the subframe N, wherein, N is a subframe number; or, when there is the primary uplink component carrier and the secondary uplink component carrier in the subframe N and both the primary uplink component carrier and the secondary uplink component carrier have a corresponding PUCCH which needs to be transmitted, the UE selecting to transmit the corresponding PUCCH in the primary uplink component carrier and the secondary uplink component carrier of the subframe N at the same time.

11. The user equipment according to claim 10, wherein the user equipment is further configured to formulate the predetermined rule in a following way:
- according to an indication signaling transmitted by a network side, determining whether the transmission of the PUCCH is switched between the primary component carrier and the secondary component carrier, or the transmission of the PUCCH is only in the primary component carrier; or
- for a time division duplex (TDD) system, when uplink and downlink configurations adopted by aggregated component carriers are not completely the same, the transmission of the PUCCH being switched between the secondary component carrier and the primary component carrier; and when the uplink and downlink configurations adopted by the aggregated component carriers are completely the same, the transmission of the PUCCH being only in the primary component carrier.

12. The user equipment according to claim 10, wherein, when uplink and downlink configurations adopted by aggregated component carriers are not completely the same, if the transmission of the PUCCH is switched between the secondary component carrier and the primary component carrier, then one component carrier from the component carriers adopting the same uplink and downlink configuration is selected as the component carrier which can transmit the PUCCH.

* * * * *